(12) United States Patent
Cheng

(10) Patent No.: US 12,517,414 B2
(45) Date of Patent: Jan. 6, 2026

(54) OPTICAL RING RESONATORS

(71) Applicant: Taiwan Semiconductor Manufacturing Company, Ltd., Hsin-Chu (TW)

(72) Inventor: Wen-Hao Cheng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 19 days.

(21) Appl. No.: 18/305,748

(22) Filed: Apr. 24, 2023

(65) Prior Publication Data

US 2024/0004264 A1 Jan. 4, 2024

Related U.S. Application Data

(60) Provisional application No. 63/391,069, filed on Jul. 21, 2022, provisional application No. 63/357,292, filed on Jun. 30, 2022.

(51) Int. Cl.
*G02F 1/365* (2006.01)
*G02F 1/35* (2006.01)
*G02F 1/355* (2006.01)

(52) U.S. Cl.
CPC ............ *G02F 1/365* (2013.01); *G02F 1/3536* (2013.01); *G02F 1/3556* (2013.01)

(58) Field of Classification Search
CPC ...... G02F 1/3526; G02F 1/3536; G02F 1/365; G02B 6/29335; G02B 6/29338–29343
See application file for complete search history.

(56) References Cited

U.S. PATENT DOCUMENTS

| 6,947,632 | B2 * | 9/2005 | Fischer ................... G02F 1/035 385/32 |
| 8,655,114 | B2 * | 2/2014 | Popovic ............. G02B 6/12007 385/32 |
| 10,261,391 | B2 * | 4/2019 | Casale .................... G02F 1/395 |
| 10,372,014 | B1 | 8/2019 | Vidrighin et al. |
| 10,649,307 | B2 | 5/2020 | Vernon et al. |
| 2012/0012739 | A1 * | 1/2012 | Koch ................. G02B 6/29341 250/227.11 |
| 2018/0261288 | A1 * | 9/2018 | Frumkin ............ G02B 6/12004 |
| 2022/0076155 | A1 | 3/2022 | MacFarlane et al. |
| 2022/0196913 | A1 * | 6/2022 | Winters ................. G02B 6/266 |
| 2023/0393339 | A1 * | 12/2023 | Pawlak ................ G02B 6/4215 |
| 2024/0004264 | A1 * | 1/2024 | Cheng ................... G02F 1/3536 |
| 2024/0369863 | A1 * | 11/2024 | Wang ..................... G02F 1/025 |

FOREIGN PATENT DOCUMENTS

| CN | 111897054 | A |   | 11/2020 |         |
| CN | 113964631 | A |   | 1/2022  |         |
| CN | 114488651 | A | * | 5/2022  | .............. G02F 7/00 |
| TW | 201413304 | A |   | 4/2014  |         |

\* cited by examiner

*Primary Examiner* — Rhonda S Peace
(74) *Attorney, Agent, or Firm* — HAYNES AND BOONE, LLP

(57) ABSTRACT

An optical device includes a ring resonator, a first optical waveguide with an end portion merged into a circumference of the ring resonator, and a second optical waveguide free of contact with the circumference of the ring resonator. The first optical waveguide is configured to receive photons. The second optical waveguide is configured to output photons coupled from the ring resonator.

20 Claims, 11 Drawing Sheets

OPTICAL RING RESONATORS

PRIORITY

This application claims the benefits of U.S. Prov. App. Ser. No. 63/357,292, filed Jun. 30, 2022 and U.S. Prov. App. Ser. No. 63/391,069, filed Jul. 21, 2022, the entire disclosures of which are incorporated herein by reference.

BACKGROUND

Optical resonators have found wide applications in classical optical communication systems. For example, optical resonators are very promising for providing high data rate, ultra-low power consumption, and small footprint (or size) for wavelength division multiplexing (WDM) technology including dense WDM (DWDM) technology in optical communication systems. Recently, optical resonators also found applications in photonic quantum technologies, such as quantum computation. For example, optical resonators may be implemented as source for providing squeezed light. Squeezed light refers to light in which the electric field strength for some phases has a quantum uncertainty (also referred to as noise) smaller than that of a coherent state. A wide range of applications can benefit from high quality sources of squeezed light. To fully exploit the potential of squeezed light in photonic quantum technologies, it is desired for the squeezed light source to have high optical power efficiency with existing optical technology. Accordingly, there is a need to further improve optical resonator structures. Classical optical communication systems may also benefit from such improvement in optical resonator structures.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

DETAILED DESCRIPTION

Figure 1A:
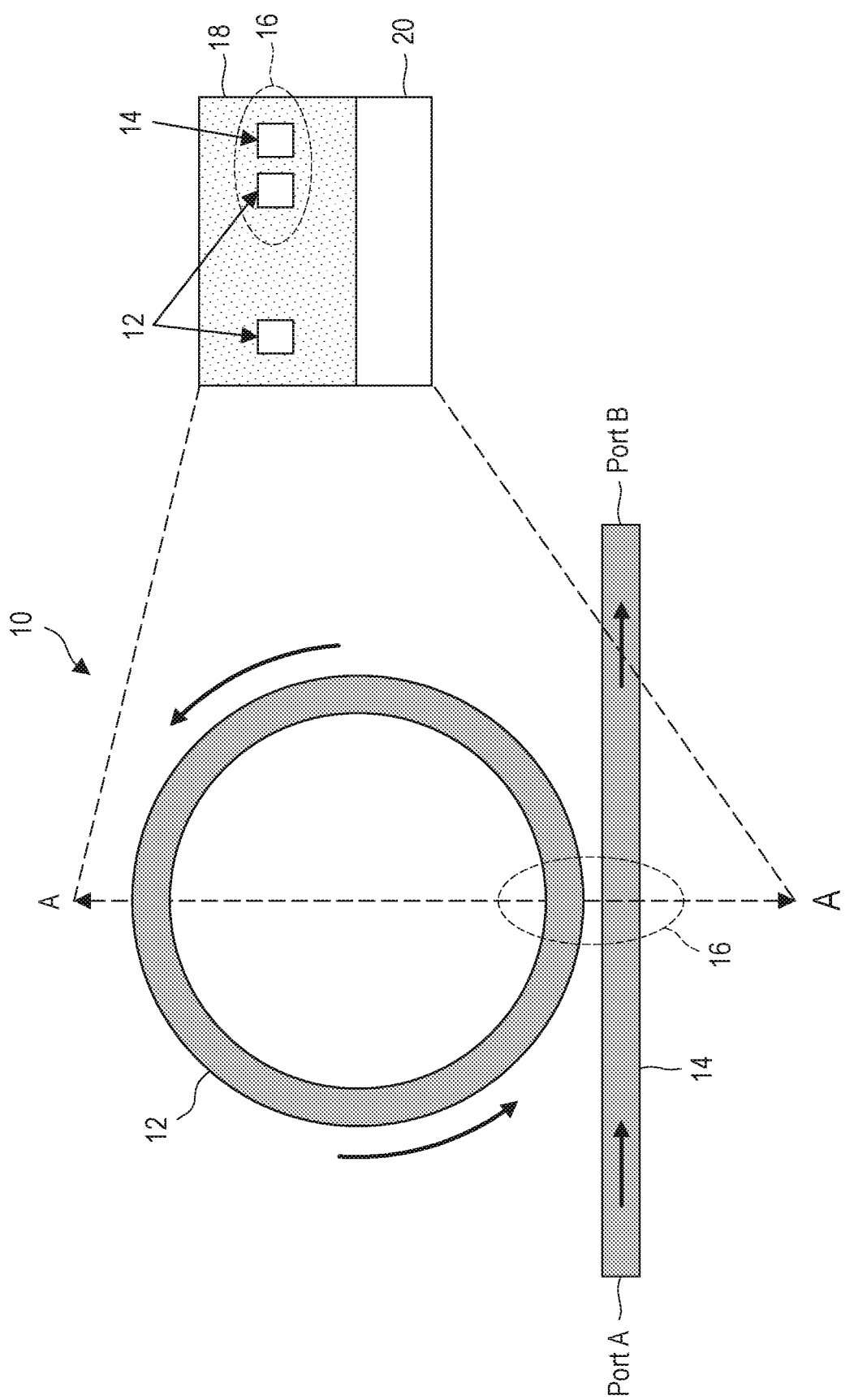
FIG. 1A illustrates a diagram of a photonic circuit with a ring resonator and a single rail optical waveguide, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.5 nm to 5.5 nm where manufacturing tolerances associated with depositing the material layer are known to be +/−10% by one of ordinary skill in the art.

The present disclosure relates to photonic circuitry (or photonic structure), particularly photonic circuitry having at least one optical ring resonator. In some exemplary embodiments, the optical ring resonator is implemented in generating squeezed light (also referred to as light in a squeezed state) for photonic quantum mechanics, such as quantum computation. The exemplary embodiments of the photonic circuitry provide photon sources with high optical power efficiency, both in-coupling efficiency and out-coupling efficiency. Meanwhile, the present disclosure is not limited thereto. Various optical communication systems or network technologies based on classical processing units also use both optical components and electronic circuits, and may implement the exemplary embodiments of the photonic circuity for performance improvement. For example, the exemplary photonic circuitry having at least one optical ring resonator may be implemented in various optical communication systems, such as in wavelength division multiplexing (WDM) applications.

Quantum mechanics can have many advantages in encoding, transmission, and processing of information. For example, quantum key distribution may be used to achieve high secure communication. Quantum metrology can be used to achieve precision measurements that could not be achieved without using quantum mechanics. In particular, a quantum computer based on quantum mechanical effects can offer exponentially faster computation or higher computation throughput. Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems, among others.

The fundamental unit of quantum information in a quantum computer is called a quantum bit, or qubit. Quantum computers may utilize physical particles to represent or implement a quantum bit. In an electron approach, a "0" or a "1" may be represented by the spin of an electron, where the up or down spin can correspond to "0", "1", or a superposition of states in which the electron's spin is both up and down at the same time. Similarly, in a photonic approach to quantum computing, a "0" may be represented by the possibility of observing a single photon in a given path (or waveguide), whereas the potential for observing the same photon in a different path may represent a "1". Photons are excellent quantum information carriers because they combine high speed with long coherence times at room temperature. Accordingly, one realization in some quantum informatic processing systems is to utilize the quantum observables of a photon to encode information in qubits.

In such photonic-based quantum computing systems, one means for determining an interval in time in which the photon can be located in a particular spatial interval is the implementation of a "heralded" system. A heralded system consists of two photons with a known temporal coincidence window wherein the first photon is referred to as the "signal" photon and the second photon is referred to as the "idler" photon. To ensure that the (signal, idler) photon pair is coincident within a particular pre-determined and temporal coincidence window, particular known physical processes are employed, depending on the system. However, such heralded systems are often quite inefficient. Most architectures for photonic-based heralded quantum computing systems can only make use of a photon pair produced from a source a fraction of the time such a pair is actually produced. As such, the coupling efficiency or optical power efficiency of such quantum circuitry is severely compromised. Most architectures for photonic-based heralded quantum computing systems also suffer from limit quality factors in which spurious light are induced. As such, the spectral purity of such quantum circuitry is often compromised as well. What is desired then, is to increase the optical power efficiency and quality factor of a heralded system in photonic-based quantum circuitry.

To generate (signal, idler) photon pairs, photonic structures having an optical resonator, such as a ring resonator (or referred to as circular resonator), may be employed. A generic ring resonator consists of an optical waveguide that is looped back on itself, such that a resonance occurs when the optical path length of the resonator is exactly a whole number of wavelengths. Ring resonators therefore support multiple resonances, and the spacing between these resonances, the free spectral range (FSR), depends on the resonator length. By utilizing particular types or configurations of ring resonators in combination with certain photon sources, or couplings of photon sources to the ring resonators, (signal, idler) photon pairs with a differentiating attribute (e.g., wavelength) may be produced. Photonic-based quantum circuitry can then make use of such photon pairs in performing quantum computing.

A first particular physical process that enables heralded systems employs the use of the principle of "spontaneous parametric down conversion" (SPDC). The SPDC process may employ a nonlinear optical material, often a crystal, to effect time coincident generation of a signal photon and corresponding idler photon as products of a nonlinear optical process. SPDC occurs due to the non-zero second-order electric susceptibility term of the dielectric polarization for a non-linear material. SPDC utilizes a single incident photon under phase matching conditions, referred to here as the "pump" photon that is characterized by a frequency, $\omega_{pump}$. The pump photon with frequency, $\omega_{pump}$, is incident to a nonlinear optical material that can spontaneously convert the single pump photon energy into a (signal, idler) pair of temporal coincident photons with each having a frequency of $\omega_{signal}$ and $\omega_{idler}$ respectively wherein $\omega_{pump}=\omega_{signal}+\omega_{idler}$. Because the second-order non-linear effects are nearly instantaneous, the detection of one of the said created pair can herald the generation of the other.

A second particular physical process that enables heralded systems employs the use of the principle of "spontaneous four-wave mixing" (SFWM). The SFWM process may employ a structure that serves as a resonant cavity with a corresponding "quality factor" denoted by Q. SFWM occurs due to the non-zero third-order electric susceptibility term of the dielectric polarization of the cavity material. It is noted that cavities made of isotropic materials (one example is silica glass) have zero-valued second-order terms, thus the non-linear response of such materials is dominated by the non-zero third-order terms. One such resonant cavity structure is the "ring resonator." Within an appropriate structure or medium, SFWM can be regarded as the virtual absorption to two pump photons of frequency $\omega_{1pump}$ and $\omega_{2pump}$ with appropriate phase matching conditions resulting in the spontaneous creation of a (signal, idler) pair. Because the third-order non-linear effects are nearly instantaneous, the detection of one of the said created pair can herald the generation of the other. Due to the mixing relationship, the frequencies of the two pump photons and those of the resulting (signal, idler) pair are related as $\omega_{1pump}+\omega_{2pump}=\omega_{signal}+\omega_{idler}$.

In herald systems it is desirable that the signal and the idler photons have a property that is different between them that allows one to be distinguished from the other, and, further, to route one of the photons differently than the other. One example of such a property is to enable slight deviations in the phase matching criterion resulting in slight predictable deviations in wavelength of the spontaneously generated (signal, idler) pairs as compared to the wavelengths of the two pump photons. The predictable wavelength deviations of a (signal, idler) pair enable the use of SFWM to generate a signal photon at a first wavelength that is time coincident with a idler photon at a second wavelength, wherein the first wavelength of the signal photon differs from the second wavelength of the idler photon.

Figure 1B:
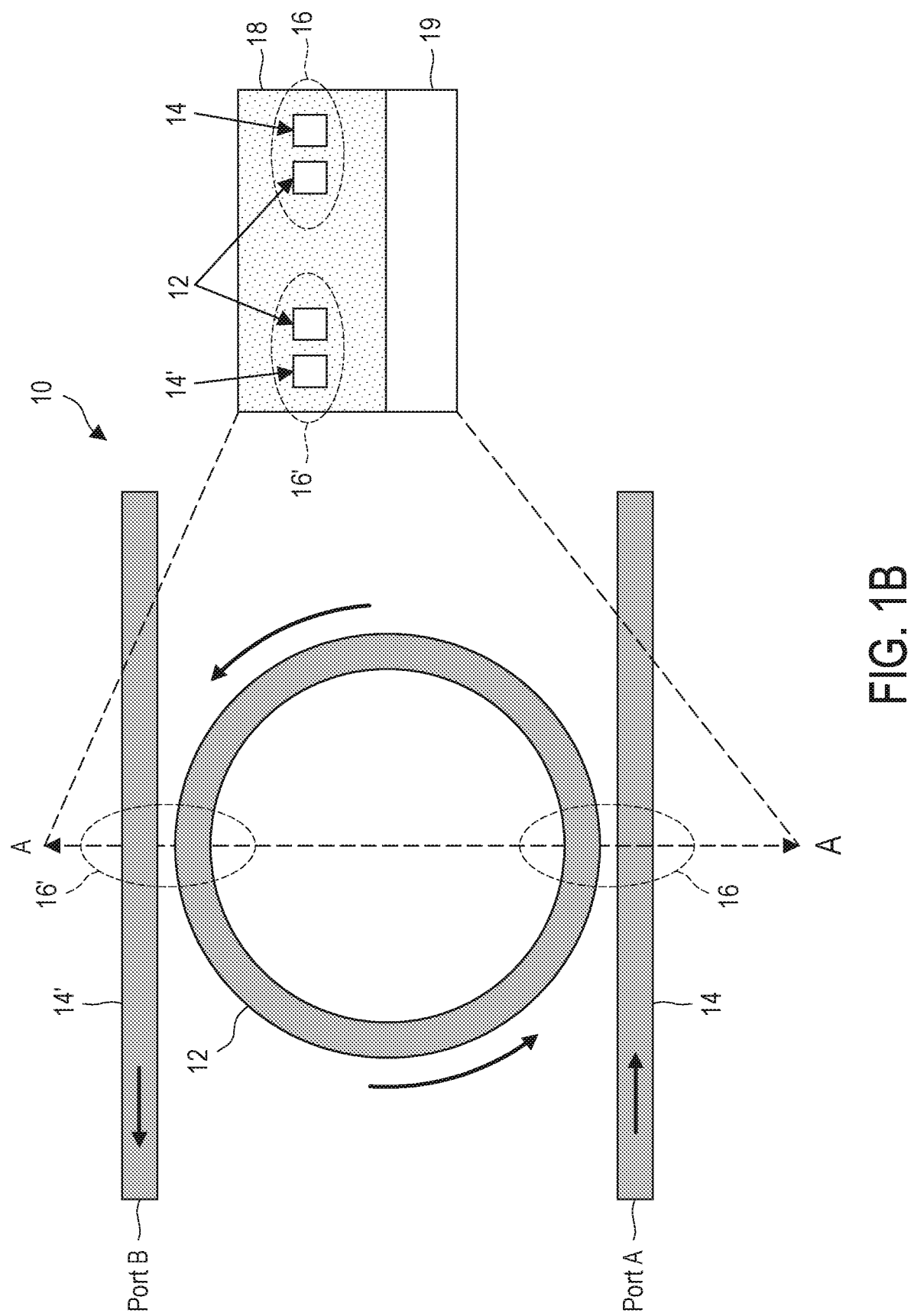
FIG. 1B illustrates a diagram of a photonic circuit with a ring resonator and dual rail optical waveguides, according to an embodiment of the present disclosure.

Referring to FIGS. 1A and 1B, some exemplary photonic circuits having a ring resonator that may be utilized as a photon pair source are illustrated. FIG. 1A illustrates a top view of a photonic circuit 10 that includes a ring resonator 12 and an optical waveguide (or referred to as bus optical waveguide) 14 in the form of a single rail. The ring resonator 12 can be considered as a type of optical waveguide in the form of a ring. A cross-sectional view of the photonic circuit 10 along a line A-A traveling through a center of the ring resonator 12 is also illustrated. The ring resonators 12 and the optical waveguide 14 each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate). Further, the ring resonator and the optical waveguides may have different material compositions.

The ring resonator 12 may include a waveguide loop such that a resonance for photons having a certain wavelength may occur when the optical path length of the ring resonator is an integer number of the wavelength of the photons. The ring resonator 12 may support multiple resonances at multiple wavelengths that may meet the resonance condition. The spacing between these resonances in spectra may be referred to as the free spectral range (FSR) and may depend on the optical path length of the ring resonator. The ring resonator 12 may have a radius less than about a millimeter (mm)—such as about 5-12 micrometers (um)—and is also referred to as a micro-ring resonator. The terms "ring resonator" and "micro-ring resonator" are used interchangeable in the present disclosure.

Photon source(s) provides photons to the optical waveguide 14 though an input port, denoted as Port A. The photons propagate in the direction towards an output port of the optical waveguide 14, denoted as Port B. Photons traveling through one optical waveguide may be coupled into an adjacent optical waveguide. This phenomenon is referred to as evanescent coupling. As photons propagates through the optical waveguide 14, a fraction will be coupled into the ring resonator 12. To increase the fraction of photons coupled into the ring resonator 12 and accordingly to increase the coupling efficiency, the ring resonator 12 is closely positioned to the optical waveguide 14 to enhance the evanescent coupling. Thus, such evanescent coupling is also referred to as near-field coupling.

A region is indicated as near-field coupling region 16 that is representative of the portion of the photonic circuit 10 where near-field coupling occurs between the ring resonator 12 and the optical waveguide 14. A fraction of the photons coupled from the optical waveguide 14 propagate into the ring resonator 12, and a remaining fraction of the photons continue to propagate in the optical waveguide 14 and exit the optical waveguide 14 from Port B. Of the fraction of the photons that are coupled into the ring resonator 12, some further fraction undergoes a spontaneous physical process. For example, spontaneous four wave mixing (SFWM) or spontaneous parametric down-conversion (SPDC) process may occur in the ring resonator 12. In an SFWM process, two pump photons may be converted into a pair of daughter photons (e.g., signal and idler photons) in the nonlinear optical material. Due to energy conservation, the signal and idler photons generated may be at frequencies that are symmetrically distributed around the pump frequency. In general, due to such a spectral correlation, the heralded photons may be in a mixed state. The signal and idler photon generated within the ring resonator 12 may be coupled out of the ring resonator 12 and back to the optical waveguide 14 and exit towards the Port B, which occur in the near-field coupling region 16 at a certain coupling efficiency. The propagation directions of the photons in the optical waveguide 14 and the ring resonator 12 may be as shown in arrows in FIG. 1A.

FIG. 1B illustrates another embodiment of the photonic circuit 10, which further includes a second optical waveguide 14' in the form of a single rail. A cross-sectional view of the photonic circuit 10 along a line A-A traveling through a center of the ring resonator 12 is also illustrated. The ring resonators 12 and the optical waveguides 14 and 14' each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate). Further, the ring resonator and the optical waveguides may have different material compositions. The signal and idler photons generated within the ring resonator 12 may be coupled out of the ring resonator 12 to the second optical waveguide 14' and exit towards the port B, which occur in a second near-field coupling region 16 at a certain coupling efficiency. The propagation directions of the photons in the first optical waveguide 14, the ring resonator 12, and the second optical waveguide 14' may be as shown in arrows in FIG. 1B.

Figure 2:
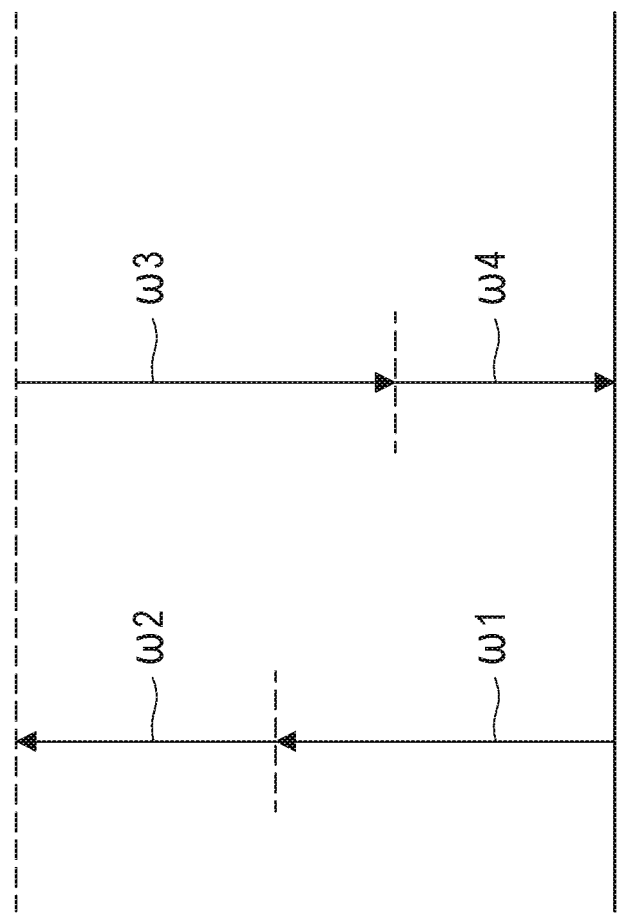
FIG. 2 shows a virtual level diagram of a spontaneous four-wave mixing process in a photon-pair source, according to an embodiment of the present disclosure.

FIG. 2 is a virtual level diagram illustrating an example of a spontaneous four wave mixing (SFWM) process occurred in a photon-pair source. A pump photon at a first frequency ω1 and a pump photon at a second frequency ω2 may be mixed to generate a pair of photons with frequencies of ω3 and ω4, respectively. The two pump photons may have a same frequency or wavelength (i.e., ω1=ω2), such as provided by a single photon source. The two pump photons may have different frequencies or wavelengths (i.e., ω1≠ω2), such as provided by two combined photon sources. Due to energy conservation, frequencies of ω3 and ω4 of generated pair of photons may be symmetrical with respect to the frequency of the pump photons in the spectrum (i.e., |ω3−ω1|=|ω1−ω4|). It is noted with respect to FIGS. 1A and 1B that what coupled to the Port A may be the output of a single source (i.e., ω1=ω2) or two (or more) combined sources (i.e., ω1≠ω2).

Figure 3A:
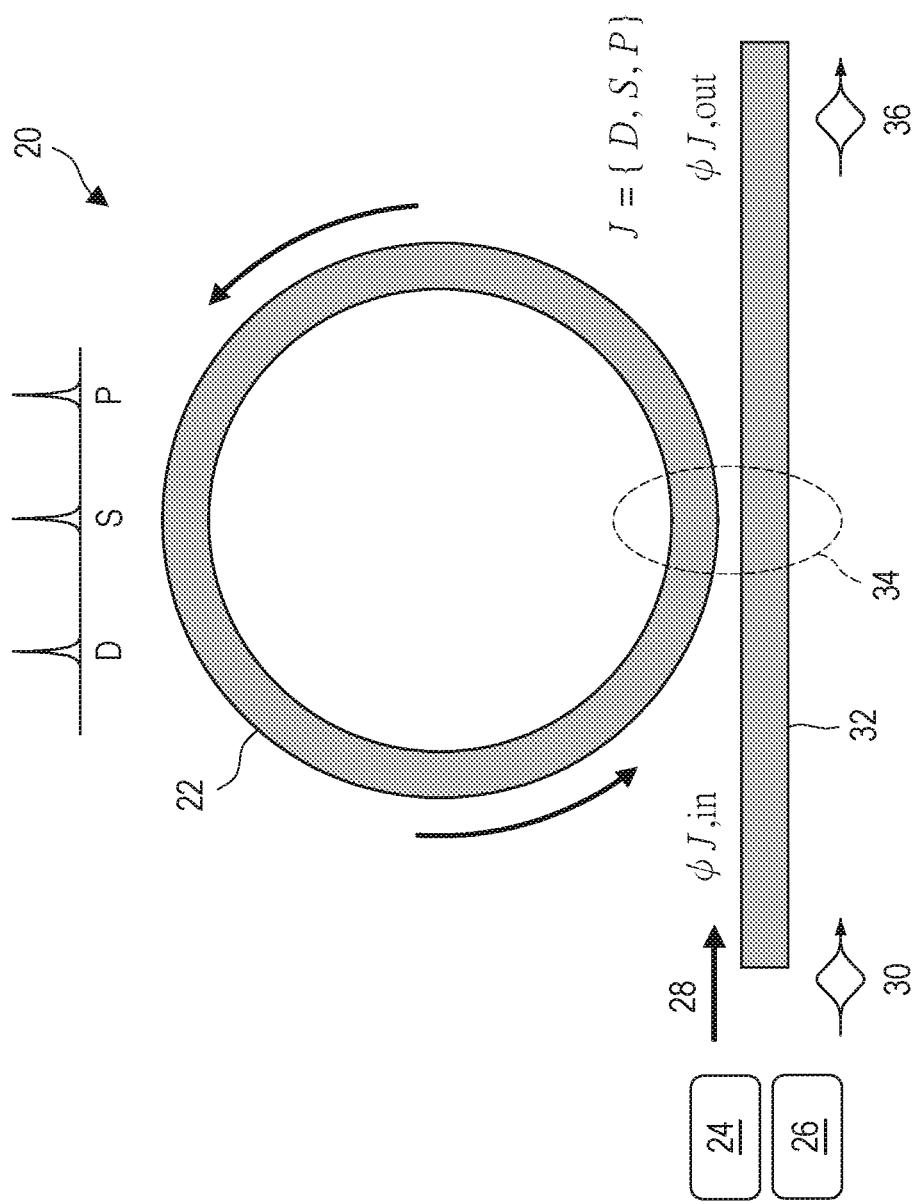
FIG. 3A illustrates a diagram of a photonic circuit with a ring resonator for generating squeezed light, according to an embodiment of the present disclosure.
Figure 3B:
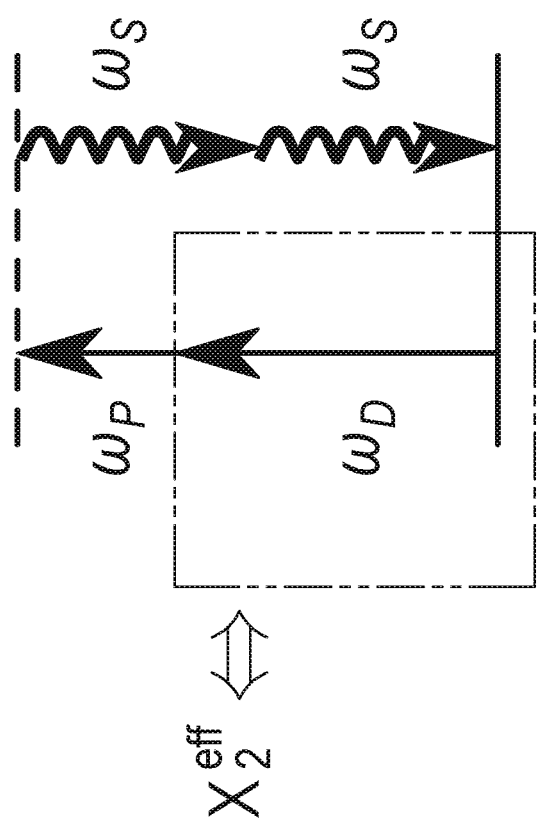
FIG. 3B shows a virtual level diagram of a dual-pumped spontaneous four-wave mixing process for generating squeezed light, according to an embodiment of the present disclosure.

With reference to FIGS. 3A and 3B, a squeezed light generating process by combining two photon sources to pump photons to the input port of a photon circuit is further examined. Particularly, FIG. 3 shows a photonic circuit 20 for generating squeezed light via an SFWM process by combining two photon sources to couple to the same port of a single rail optical waveguide, according to an embodiment. Combining two photon sources may be useful in particular applications for a plurality of reasons as will be understood by those of skill in the art. As a first fold, it may be useful to combine one source that is in the form of a pulsed laser and another source as an external pumping laser to produce a composite pumped pulsed source for use in the classical domain. As a second fold, it may be useful to combine two sources that generate photons of different frequencies as input to a single port to control physical processes such as SFWM that may occur within an optical resonator.

Squeezed light (also referred to light in a squeezed state) refers to light in which the electric field strength for some phases has a quantum uncertainty (also referred to as noise) smaller than that of a coherent state. A wide range of applications can benefit from high quality sources of squeezed light. For example, in metrology, using squeezed light allows certain optical sensors to overcome the shot noise limit and achieve sensitivities many times higher than possible with conventional light sources. In quantum communications, squeezed light can be used to distribute entanglement, thereby assisting cryptographic key distribution protocols. Squeezed light sources can also be used to deterministically generate massive highly entangled quantum states, enabling the construction of scalable quantum simulation and computation devices operating in the optical domain using a continuous variable encoding.

The photonic circuit 20 includes a ring resonator 22 characterized by a third-order nonlinear optical susceptibility. A drive light source 24 is in optical communication with the ring resonator 22 and configured to send a drive light beam 28 to the ring resonator 22 via an optical waveguide 32. The drive light beam 28 may include a continuous wave (CW) light beam. A pump light source 26 is in optical communication with the ring resonator 22 and configured to send a pump light beam 30 to the ring resonator 22 via the optical waveguide 32. The pump light beam 30 includes a pulsed light beam. The pump light beam 30 and the drive light beam 28 are configured to generate a signal light beam in a squeezed state of light via an SFWM process occurred in the ring resonator 22.

In some embodiments, the photonic circuit 20 can be constructed on an integrated nanophotonic platform. For example, the drive light source 24 (e.g., a CW semiconductor laser), the pump light source 26 (e.g., a pulsed semiconductor laser), the ring resonator 22, and the optical waveguide 32 can be fabricated on the same semiconductor substrate, thereby forming an integrated squeezed light source. In furtherance of some embodiments, the drive light source 24 and/or the pump light source 26 can include semiconductor lasers. In some embodiments, the drive light source 24 and/or the pump light source 26 can include lasers, light emitting diodes (LEDs), or any other appropriate type of light source. In some embodiments, the ring resonator 22 includes appropriate material that has a strong third order susceptibility. For example, the ring resonator 22 and the waveguide 32 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

In some embodiments, the power of the drive light beam 28 can be ten times or greater than the power of the pump light beam 30. In some embodiments, the power of the drive light beam 28 can be about 20 mW or greater. In one implementation, approximately 100 mW of drive power from the drive light beam 28 can be coupled to the ring resonator 22. Only a few mW or less of pulsed pump power from the pump light beam 30 can produce squeezed light having a squeezing factor (or squeeze level) of several dB. The generated squeezed state can be engineered to have single-temporal-mode nature by over-coupling the pulsed pump resonance (i.e., over-coupling between the pump light beam 30 and the ring resonator 22) via a couple region 34 based on Mach-Zehnder interferometer (MZI) and driving the four-wave mixing with a short pulse duration, without seriously compromising the efficiency. More modest over-coupling of the signal resonance (i.e., over-coupling between the signal light beam 36 and the ring resonator 22) can mitigate losses, thereby allowing nearly pure states to be generated.

In some embodiments, the drive light source 24 and/or the pump light source 26 are tunable so as to control the properties of the signal light beam 36. The magnitude and angle of the squeezing parameters can be determined by the product of the amplitudes of the drive light beam 28 and the pump light beam 30. Accordingly, the magnitude and angle of the squeezing can be controlled by modulating one or both of the input beams 28 and 30. In addition, the squeezing angle can be locked to the sum phase of the drive light beam 28 and the pump light beam 30. Furthermore, the squeezing factor can be controlled by the product of the powers of the two input beams 28 and 30. The squeezed output can therefore be calibrated against and controlled by the input powers and phases.

In some implementations, the output frequency of the drive light source 24 and/or the pump light source 26 can be tunable so as to change the squeezing factor of the signal light beam 36. In some implementations, the power of the drive light source 24 and/or the pump light source 26 can be tunable so as to change the squeezing factor of the signal light beam 36. In some implementations, the relative phase between the drive light source 24 and the pump light source 26 can be tunable so as to change the phase of the signal light beam 36.

The mechanism of squeezing underlying the photonic circuit 20 is naturally suited to engineering highly tunable devices with controllable temporal mode structure. More specifically, the wavelengths of the drive light beam 28 and the pump light beam 30 can be readily tunable. In addition, removal of unwanted pump light and suppression of unwanted spurious light can also be relatively easily achieved (e.g., via couplers). The resulting squeezed light source is therefore suited for quantum computing applications.

The ring resonator 22 can accommodate a number of resonant optical modes J, each of which is assigned a quantum-mechanical annihilation operators $b_J$. In the ring resonator 22, three optical modes are of interest here, i.e., the drive mode D, the signal mode S, and the pump mode P, with corresponding optical angular frequencies $\omega_D$, $\omega_S$, and $\omega_P$. These resonances may not be evenly spaced in their intrinsic configuration (e.g., due to material and modal dispersion). Accordingly, regarding quantum-mechanical annihilation operators $b_J$, $b_D$ represents the resonant optical mode of the drive light beam 28, $b_P$ represents the resonant optical mode of the pump light beam 30, and $b_S$ represents the resonant optical mode of the signal light beam 36.

FIG. 3B shows a virtual level diagram of the dual-pumped spontaneous four-wave mixing for generating squeezed light, according to an embodiment. In the presence of this effective second-order nonlinearity, a weaker coherent pump pulse in the P mode thereby produces photon pairs via parametric fluorescence into the S mode. Using a strong CW pump in conjunction with the intrinsic $\chi 3$ response can mediate an effective $\chi 2$ interaction (labelled as $\chi_2^{eff}$ in FIG. 3) in an integrated resonator. Particularly, to bring the desired parametric fluorescence process into resonance, a strong CW drive beam can be used to induce a nonlinear detuning via cross-phase modulation, pushing the D, S, and P resonances into an evenly spaced configuration in frequency. The pump mode P is driven by a sufficiently weak pump light beam 30, which only induces negligible self-phase modulation and cross-phase modulation. The signal mode S carries the generated squeezed light of interest. The third-order nonlinear optical response of the resonator material leads to an interaction Hamiltonian (representing the energy of the four-wave system) that contains a coefficient A is related to the resonator structure and the strength of the third-order optical nonlinearity of the resonator. For a ring resonator, the coefficient $\Lambda$ can be written as $\Lambda \approx \hbar \omega_S v_g^2 \gamma_{NL}/2L$, where $\hbar$ is reduced Planck constant, $\omega_S$ is the frequency of the signal light beam 36, $v_g$ is the group velocity, L is the resonator length, and $\gamma_{NL}$ the waveguide nonlinear parameter. This interaction Hamiltonian is known to lead to a squeezed state of the signal S mode within the resonator via parametric fluorescence. This mode is coupled to the channel field (i.e., optical field within the waveguide 32), producing a propagating squeezed light output.

During squeezed light generation, a ring resonator may accommodate hundreds or even thousands of resonances. Out of these resonances (also referred to as auxiliary resonances or unwanted resonances), at least two processes are relevant to the performance in generating squeezed light. The first one gives rise to unwanted spontaneous four-wave mixing, leading to the generation of spurious photons in the S mode. The second one gives rise to Bragg-scattering four-wave mixing, leading to an additional source of loss on the squeezed state generated in the S mode. Suppression of these unwanted photons is therefore beneficial to yield a highly-pure low-noise squeezed output (or referred to as a higher squeeze level, measured in dB).

Still referring to FIG. 3A, in a single-rail photonic circuitry, source photons are injected into the device by means of the single-rail waveguide after which source photons may be coupled into the ring resonator through near-field coupling or continue to travel through the waveguide and exit. Not all the photons would be coupled into the ring resonator. Generally, about 10% to about 40% of the source photons are coupled into the ring resonator. This input efficiency is sometimes termed as in-coupling efficiency (or input efficiency). Among the source photons that are coupled into the ring resonator, a fraction is converted to the desired squeezed photons and eventually coupled back to the waveguide and exit. Not all the generated squeezed photons would be coupled out of the ring resonator. Generally, about 50% to about 75% of the generated squeezed photons would be coupled out of the ring resonator, while other squeezed photons are dissipated due to intrinsic losses of the ring resonator, including bending loss, absorption, and scattering. The photon recollection efficiency is sometimes terms as out-coupling efficiency (or escape efficiency, output efficiency). In-coupling efficiency and out-coupling efficiency are important factors in determining optical power efficiency. With a typical 10%-40% in-coupling efficiency and 50%-70% out-coupling efficiency, an optical power efficiency of a single-rail photonic circuitry is often less than about 30%.

FIGS. 4-9 illustrate various embodiments of photonic circuitry with carefully designed input and output coupling mechanisms to achieve nearly 100% in-coupling efficiency and nearly 100% out-coupling efficiency, and accordingly nearly 100% optical power efficiency.

Figure 4:
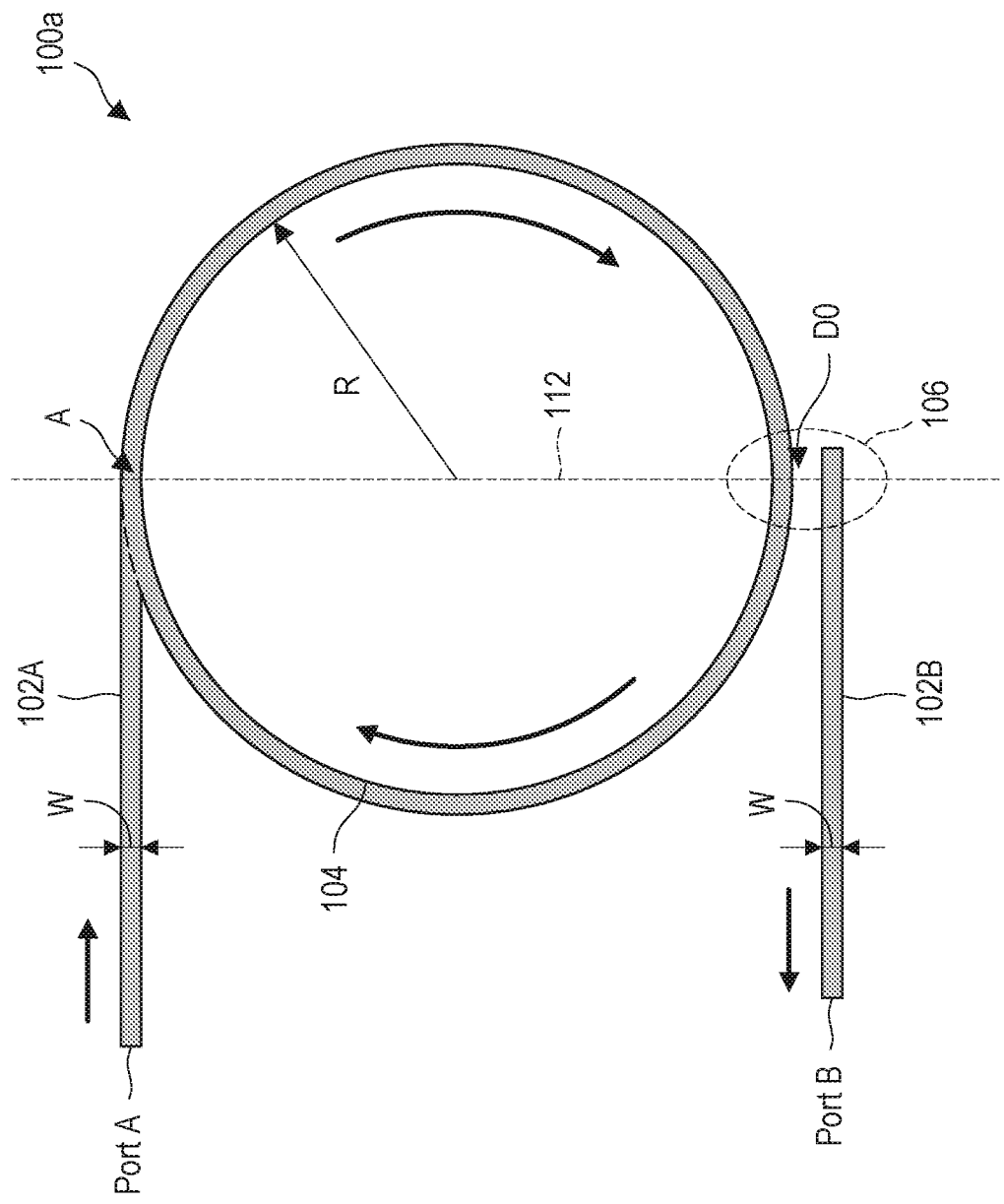
FIGS. 4, 5, 6, 7, 8, and 9 illustrate photonic circuits with a ring resonator with implementations of different input and output coupling mechanisms, according to some embodiments of the present disclosure.

Referring to FIG. 4, a photonic circuit 100a includes a first optical waveguide 102A, a second optical waveguide 102B, and a ring resonator 104. The first and second optical waveguides 102A and 102B and the ring resonator 104 each may include a non-linear optical material (such as silicon nitride or other suitable material including LiNbO$_3$, AlGaAs, InP, or AlN) surrounded by an oxide layer (such as silicon dioxide) that is disposed over a semiconductor substrate (such as a silicon substrate). Further, the ring resonators and the optical waveguides may have different material compositions.

The first optical waveguide 102A has the form of a straight rail with an input port Port A. The straight rail is tangentially in contact with the circumference of the ring resonator 104 at point A. That is, at point A the first optical waveguide 102A merges into the circumstance of the ring resonator 304. A virtual line 112 traveling through point A and the center of the ring resonator 304 is perpendicular to the straight rail of the first optical waveguide 102A.

The second optical waveguide 102B has the form of a straight rail with an output port Port B. The straight rail of the second optical waveguide 102B is parallel to the straight rail of the first optical waveguide 102a and perpendicular to the virtual line 112. Port A and Port B are on the same side of the virtual line 112. The straight rail of the second optical waveguide 102B has a distance D0 from the circumference of the ring resonator 104 to receive photons by near-field coupling.

The ring resonator 104 has a radius R, and the optical waveguides 102A and 102B each have a width W. In some embodiments, R ranges from about 5 um to about 12 um. In some embodiments, W ranges from about 1 um to about 2 um. In some embodiments, D0 ranges from about 100 nm to about 1 um. The above numeral values are exemplary, and the dimensions and intervals of the ring resonator 104 and the optical waveguides 102A and 102B can be variously formed in consideration of the wavelength of the incident light and the desired squeeze level.

Photon source(s) provides photons to the first optical waveguide 102A at Port A. The source (incident) photons propagate in the direction towards the point A. At the point A source photons are directly injected into the ring resonator 104. Since source photons have not alternative route to avoid entering the ring resonator 104, direct injection may achieve nearly 100% in-coupling efficiency. Among the source photons that are coupled into the ring resonator 104, some fraction undergoes a spontaneous physical process, such as a SFWM process, as they propagate through the ring resonator 104. The squeezed photons are generated. If not dissipated by intrinsic losses in the ring resonator 104, the squeezed photons eventually escape from the ring resonator 104 and are recollected by the second optical waveguide 102B. A region is indicated as coupling region 106 that is representative of the portion of the photonic circuit 100a where evanescent coupling (near-field coupling) occurs between the ring resonator 104 and the second optical waveguide 102B. As such evanescent coupling is often confined in a small region surrounding a point on a ring resonator that is in the shortest distance to an optical waveguide, the out-coupling mechanism in FIG. 4 is also termed as tangential-near-field-coupled out. The squeezed photons continue to propagate along the straight rail of the second optical waveguide 102B and exit through Port B.

The overall coupling mechanism is referred to as tangential-inject in and tangential-near-field-coupled out. Without considering the intrinsic losses, such as bending loss, absorption, and scattering, nearly all the source photons are directly injected into the ring resonator 104 through the first optical waveguide 102A, and nearly all the generated squeezed photons are recollected by the second optical waveguide 102B. The in-coupling efficiency is nearly 100%, and the out-coupling efficiency is also nearly 100%.

Figure 5:
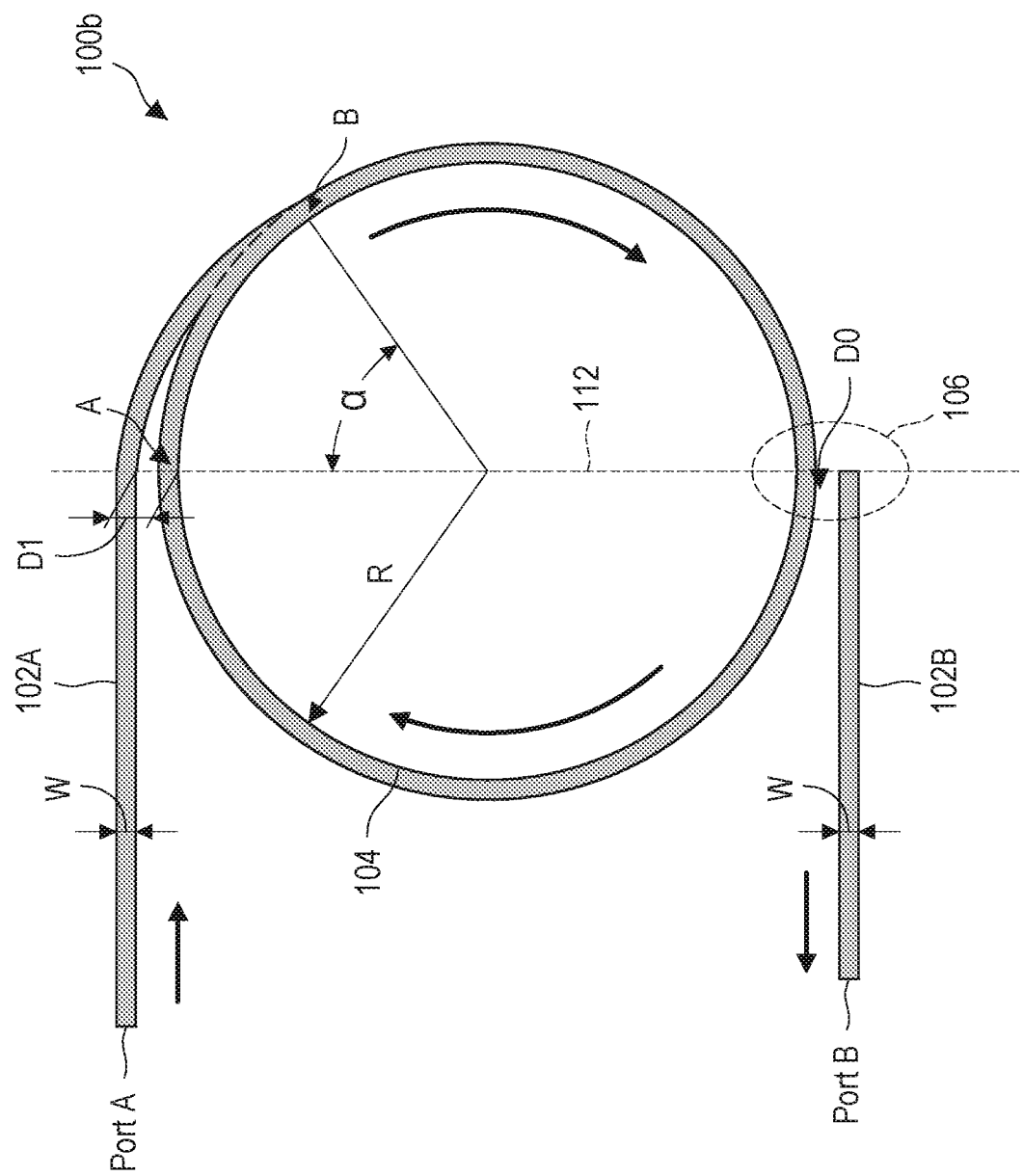

Referring to FIG. 5, a photonic circuit 100b includes a first optical waveguide 102A, a second optical waveguide 102B, and a ring resonator 104. The first and second optical waveguides 102A and 102B and the ring resonator 104 each may include a non-linear optical material (such as silicon nitride or other suitable material including LiNbO$_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

The first optical waveguide 102A has a first portion (input portion or rail portion) in a form of a straight rail that has an input port Port A and a second portion (injection portion or tapering portion) that starts tapering towards the circumference of the ring resonator 104 at a point A and intersects the circumference of the ring resonator 104 at a point B. The straight rail is tangential with respect to the circumference of the ring resonator 104 with a distance D1. That is, a distance between the circumference of the ring resonator 104 and the tapering portion decreases from a distance D1 at point A to zero at point B. A virtual line 112 traveling through the point A and the center of the ring resonator 304 is perpendicular to the straight rail. A central angle subtended by the tapering portion of the first optical waveguide 102A (from point A to point B) is denoted as central angle α. In various embodiments, the central angle α may be less than about 90°, such as from about 30° to about 90°. In furtherance of embodiments, the central angel α may be less than about 45°, such as in a range from about 30° to about 45°.

The second optical waveguide 102B has the form of a straight rail with an output port Port B. The straight rail of the second optical waveguide 102B is parallel to the straight rail of the first optical waveguide 102a and perpendicular to the virtual line 112. Port A and Port B are on the same side of the virtual line 112. The straight rail of the second optical waveguide 102B has a distance D0 from the circumference of the ring resonator 104 to receive photons by near-field coupling.

The ring resonator 104 has a radius R, and the optical waveguides 102A and 102B each have a width W. In some embodiments, R ranges from about 5 um to about 12 um. In some embodiments, W ranges from about 1 um to about 2 um. In some embodiments, D0 and D1 each range from about 100 nm to about 1 um. The above numeral values are exemplary, and the dimensions and intervals of the ring resonator 104 and the optical waveguides 102A and 102B can be variously formed in consideration of the wavelength of the incident light and the desired squeeze level. For example, the distance D0 may be smaller than D1 (D0<D1) to ensure a strong near-field coupling to better recollect escaping squeezed photons.

Photon source(s) provides photons to the first optical waveguide 102A at Port A. The source (incident) photons propagate in the direction towards the point A. Through the tapering portion of the first optical waveguide 102A, source photons are directly injected into the ring resonator 104 at the point B. The tapering portion provides a smooth transition in the optical path and mitigates reflection from occurring at an abrupt interface. Since source photons have not alternatively route to avoid entering the ring resonator 104, direct injection may achieve nearly 100% in-coupling efficiency. Among the source photons that are coupled into the ring resonator 104, some fraction undergoes a spontaneous physical process, such as a SFWM process, as they propagate through the ring resonator 104. The squeezed photons are generated. If not dissipated by intrinsic losses in the ring resonator 104, the squeezed photons eventually escape from the ring resonator 104 and are recollected by the second optical waveguide 102B. A region is indicated as coupling region 106 that is representative of the portion of the photonic circuit 100a where evanescent coupling (near-field coupling) occurs between the ring resonator 104 and the second optical waveguide 102B. The out-coupling mechanism is tangential-near-field-coupled out. The squeezed photons continue to propagate along the straight rail of the second optical waveguide 102B and exit through Port B.

The overall coupling mechanism is referred to as taper-inject in and tangential-near-field-coupled out. Without considering the intrinsic losses, such as bending loss, absorption, and scattering, nearly all the source photons are directly injected into the ring resonator 104 through the first optical waveguide 102A, and nearly all the generated squeezed photons are recollected by the second optical waveguide 102B. The in-coupling efficiency is nearly 100%, and the out-coupling efficiency is also nearly 100%.

Figure 6:
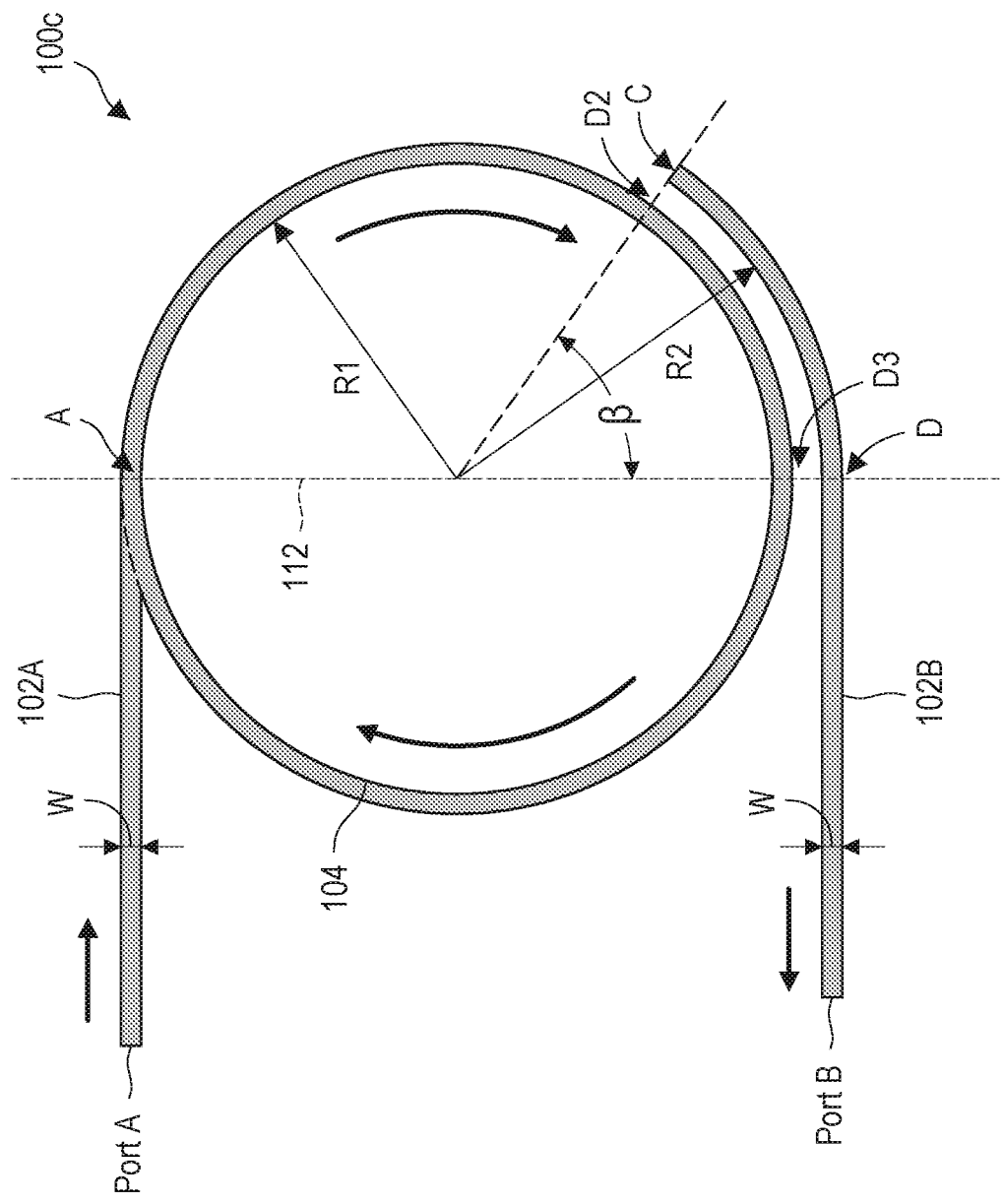

Referring to FIG. 6, a photonic circuit 100c includes a first optical waveguide 102A, a second optical waveguide 102B, and a ring resonator 104. The first and second optical waveguides 102A and 102B and the ring resonator 104 each may include a non-linear optical material (such as silicon nitride or other suitable material including LiNbO$_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

The first optical waveguide 102A has the form of a straight rail with an input port Port A. The straight rail is tangentially in contact with the circumference of the ring resonator 104 at point A. That is, at the point A the first optical waveguide 102A merges into the circumstance of the ring resonator 304, and a virtual line 112 traveling through the point A and the center of the ring resonator 304 is perpendicular to the straight rail.

The second optical waveguide 302B has a first portion (coupling portion or arc portion) in a form of an arc that partially circles the ring resonator 104 and a second portion (output portion or rail portion) in the form of a straight rail that has an output port Port B. By partially circling the ring resonator 104, the coupling path is extended, and efficiency of collecting photons escaping from the ring resonator 104 is increased, which mitigates intrinsic losses occurred in a ring resonator, particularly bending loss and scattering loss. The distances between the circumference of the ring resonator 104 and the starting point C and ending point D of the coupling portion are denoted as D2 and D3, respectively. The arc shape of the coupling portion may partially circle the ring resonator 104 conformally (i.e., the arc and the ring are concentric) with a constant distance (i.e., D2=D3). Alternatively, the arc shape of the coupling portion may gradually taper away from the second ring resonator 306 (i.e., D2<D3). The point A of the injection portion of the first optical waveguide 102A and the ending point D of the coupling portion of the second optical waveguide 102B may both land on a virtual line 112 traveling through a center of the ring resonator 104. The virtual line 112 may be perpendicular to the straight rails of both the first and second optical waveguides 102A and 102B.

Photon source(s) provides photons to the first optical waveguide 102A at Port A. The source (incident) photons propagate in the direction towards the injection portion that merges with the circumference of the ring resonator 104. Due to the direct injection, almost all the source photons enter the ring resonator 104 with a nearly 100% in-coupling efficiency. An SFWM process may occur in the ring resonator 104, and thus a fraction of photons undergoes the SFWM process and squeezed photons are generated. The photons (if not dissipated) eventually are coupled to the second optical waveguide 102B through its arc-shape coupling portion and propagate towards the Port B. The arc portion provides a longer path for recollecting squeezed photons and increases photon recollection rate, which effectively mitigate intrinsic losses. Such coupling is also referred to as tangential-inject in and circumferential-near-field-coupled out. Notably, the input mechanism can also be taper-inject in as discussed above with reference to FIG. 5. Thus, the coupling may also be taper-inject in and circumferential-near-field-coupled out.

Figure 7:
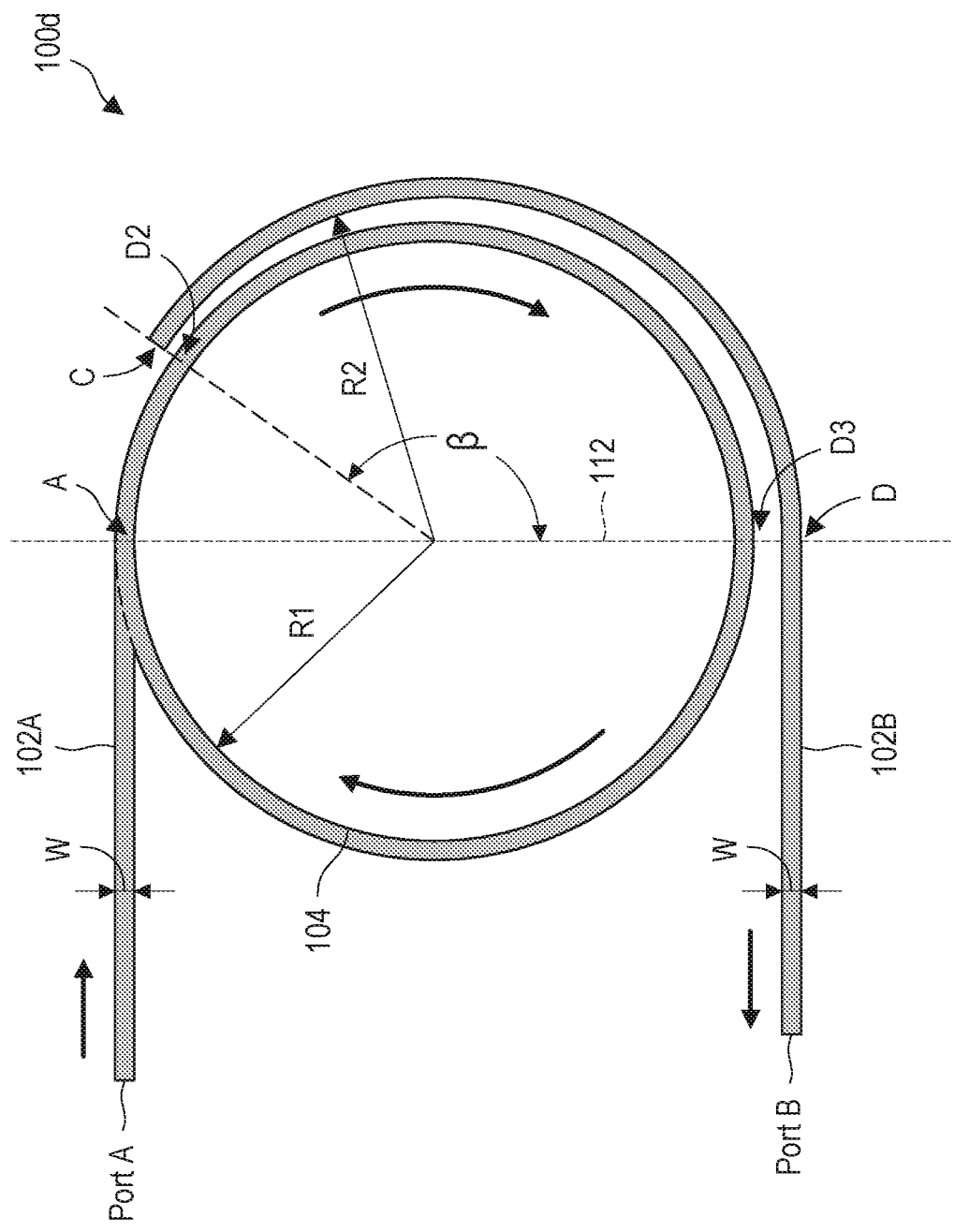

A central angle subtended by the coupling portion of the second optical waveguide 102B (from point C to point D) is denoted as central angle β. In various embodiments, the central angle β may be not less than the about 30°. This value is not trivial. If the central angle β is less than about 30°, the arc potion may be less efficient in recollecting squeezed photons. In the embodiment as illustrated in FIG. 6, the central angle β is less than about 90°, such as in a range from about 30° to about 90°. The photonic circuit 100d as illustrated in FIG. 7 is substantially similar to the embodiment in FIG. 6, and one difference is that the central angle β may be larger than about 90°, such as in a range from about 100° to about 170°. A larger central angel β translates to a longer path for recollecting squeezed photons and increases photon recollection rate.

Referring to FIGS. 6 and 7 collectively, the ring resonator 104 has a radius R1, the arc portion of the second ring resonator 102B has a radius R2, and the straight rail portions of the optical waveguides 102A and 102B each have a width W. In some embodiments, R1 and R2 each range from about 5 um to about 12 um with R1 less than R2 (R1<R2). In some embodiments, W ranges from about 1 um to about 2 um. In some embodiments, D2 and D3 each range from about 100 nm to about 1 um. The above numeral values are exemplary, and the dimensions and intervals of the ring resonator 104 and the optical waveguides 102A and 102B can be variously formed in consideration of the wavelength of the incident light and the desired squeeze level. In some embodiments, to create a strong co-resonance between the ring resonator 104 and the arc portion of the second ring resonator 102B to increase quality factor and squeeze level of the ring resonator, R1 and R2 may meet the following condition:

$$\begin{cases} 2\pi n_1 R_1 = m_1 \lambda \\ 2\pi n_1 R_2 = m_2 \lambda \\ \frac{n_1 R_1}{m_1} = \frac{n_2 R_2}{m_2} \end{cases} \quad \text{(Equation 1-1)}$$

in which $n_1$ is the reflective index of the ring resonator 104, $n_2$ is the reflective index of the second optical waveguide 102B, $m_1$ is the resonator mode in the ring resonator 104, $m_2$ is the resonator mode in the arc portion of the second optical waveguide 102B, and $\lambda$ is the wavelength of the squeezed photons.

Figure 8:
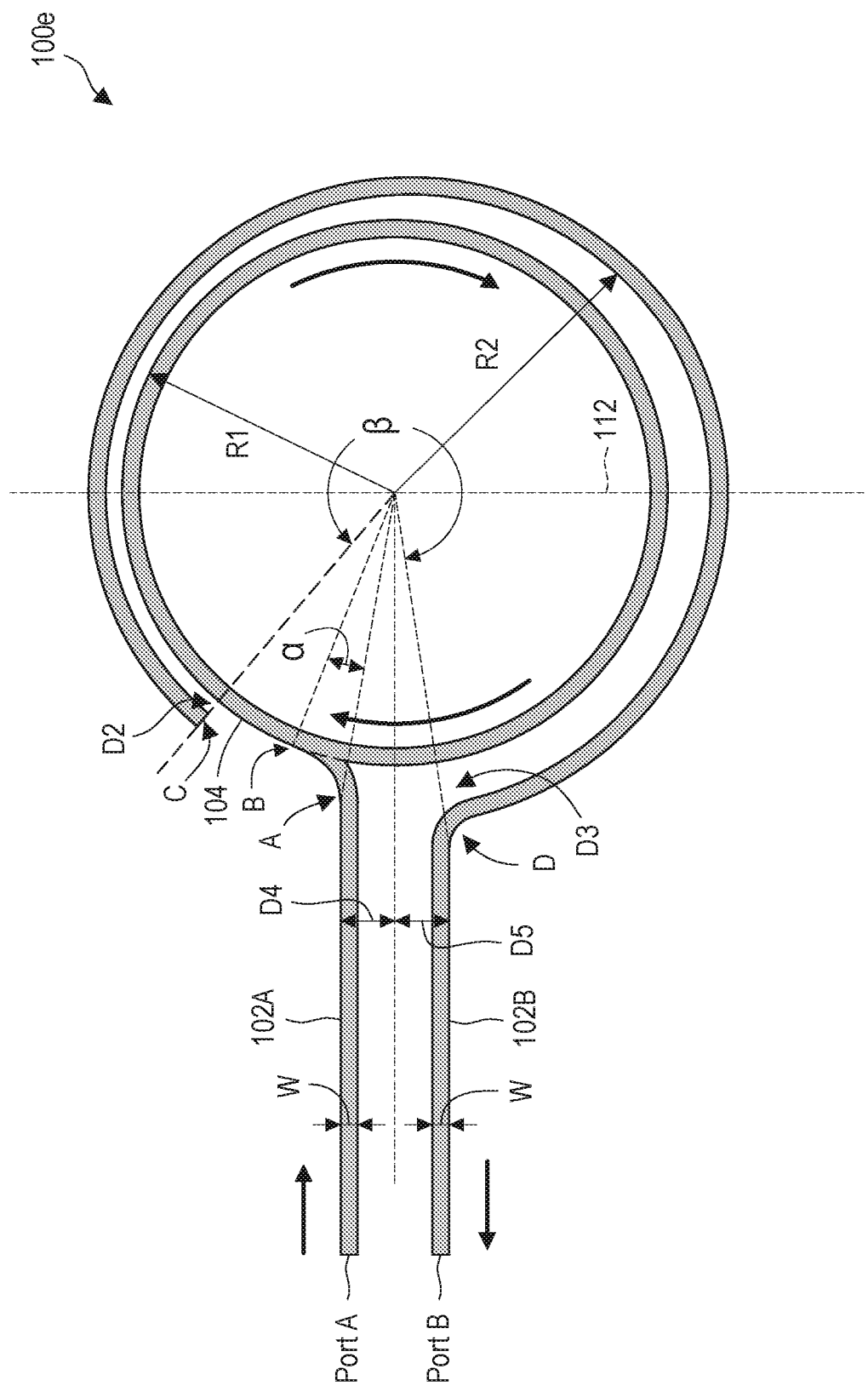

Referring to FIG. 8, a photonic circuit 100e includes a first optical waveguide 102A, a second optical waveguide 102B, and a ring resonator 104. The first and second optical waveguides 102A and 102B and the ring resonator 104 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

The first optical waveguide 102A has a first portion (input portion or rail portion) in a form of a straight rail that has an input port Port A and a second portion (injection portion or tapering portion) that starts tapering towards the circumference of the ring resonator 104 at a point A and intersects the circumference of the ring resonator 104 at a point B. Different from the embodiment illustrated in FIG. 5, in which the straight rail is tangential with respect to the circumference of the ring resonator 104 with a distance, in the illustrated embodiment in FIG. 8 an extension of the straight rail intersects the circumference of the ring resonator 104. The straight rail has a distance D4 to a virtual line 112 traveling through a center of the ring resonator 104 and parallel to the straight rail. The distance D4 is less than the radius of the ring resonator 104.

The second optical waveguide 102B has a first portion (coupling portion or arc portion) in a form of an arc that partially circles the ring resonator 104 and a second portion (output portion or rail portion) in the form of a straight rail that has an output port Port B. An extension of the straight rail of the second optical waveguide 102B intersects the circumference of the ring resonator 104. The straight rail of the second optical waveguide 102B is parallel to the straight rail of the first optical waveguide 102A and has a distance D5 to the virtual line 112 traveling through a center of the ring resonator 104. D5 is less than the radius of the ring resonator 104. Regarding the arc potion, by partially circling the ring resonator 104, the coupling path is extended, and efficiency of collecting photons escaping from the ring resonator 104 is increased, which mitigates intrinsic losses occurred in a ring resonator, particularly bending loss and scattering loss. The distances between the circumference of the ring resonator 104 and the starting point C and ending point D of the coupling portion are denoted as D2 and D3, respectively. The arc shape of the coupling portion may partially circle the ring resonator 104 conformally (i.e., the arc and the ring are concentric) with a constant distance (i.e., D2=D3). Alternatively, the arc shape of the coupling portion may gradually taper away from the second ring resonator 306 (i.e., D2<D3).

The ring resonator 104 has a radius R1, the arc portion of the second ring resonator 102B has a radius R2, and the straight rail portions of the optical waveguides 102A and 102B each have a width W. In some embodiments, R1 and R2 each range from about 5 um to about 12 um with R1 less than R2 (R1<R2). In some embodiments, W ranges from about 1 um to about 2 um. In some embodiments, D2, D3, D4, and D5 each range from about 100 nm to about 1 um. In some embodiments, D4 equals D5 (D4=D5). In some embodiments, D4 is larger than D5 (D4>D5) or less than D5 (D4<D5). The above numeral values are exemplary, and the dimensions and intervals of the ring resonator 104 and the optical waveguides 102A and 102B can be variously formed in consideration of the wavelength of the incident light and the desired squeeze level. In some embodiments, to create strong co-resonance between the ring resonator 104 and the arc portion of the second ring resonator 102B to increase quality factor and squeeze level of the ring resonator, R1 and R2 may meet the condition represented by Equation 1-1 listed above.

A central angle subtended by the tapering portion of the first optical waveguide 102A (from point A to point B) is denoted as central angle α, and a central angle subtended by the coupling portion of the second optical waveguide 102B (from point C to point D) is denoted as central angle β. In various embodiments, the central angle β may be larger than the central angle α. In some embodiments, the central angle α is less than about 90°, such as in a range from about 30° to about 90°. In some embodiments, the central angle β is above 90°. In the embodiment as illustrated in FIG. 8, the central angle β is larger than about 180°, such as in a range from about 190° to about 330°. In some alternative embodiments, the central angle β is less than about 90°, such as in a range from about 30° to about 90°.

Photon source(s) provides photons to the first optical waveguide 102A at Port A. The source (incident) photons propagate in the direction towards the injection portion that merges with the circumference of the ring resonator 104. Due to the direct injection, almost all the source photons enter the ring resonator 104 with a nearly 100% in-coupling efficiency. An SFWM process may occur in the ring resonator 104, and thus a fraction of photons undergoes the SFWM process and squeezed photons are generated. The photons (if not dissipated) eventually are coupled to the second optical waveguide 102B through its arc-shape coupling portion and propagate towards the Port B. The arc portion provides a longer path for recollecting squeezed photons and increases photon recollection rate, which effectively mitigate intrinsic losses. Such coupling is also referred to as taper-inject in and circumferential-near-field-coupled out.

Figure 9:
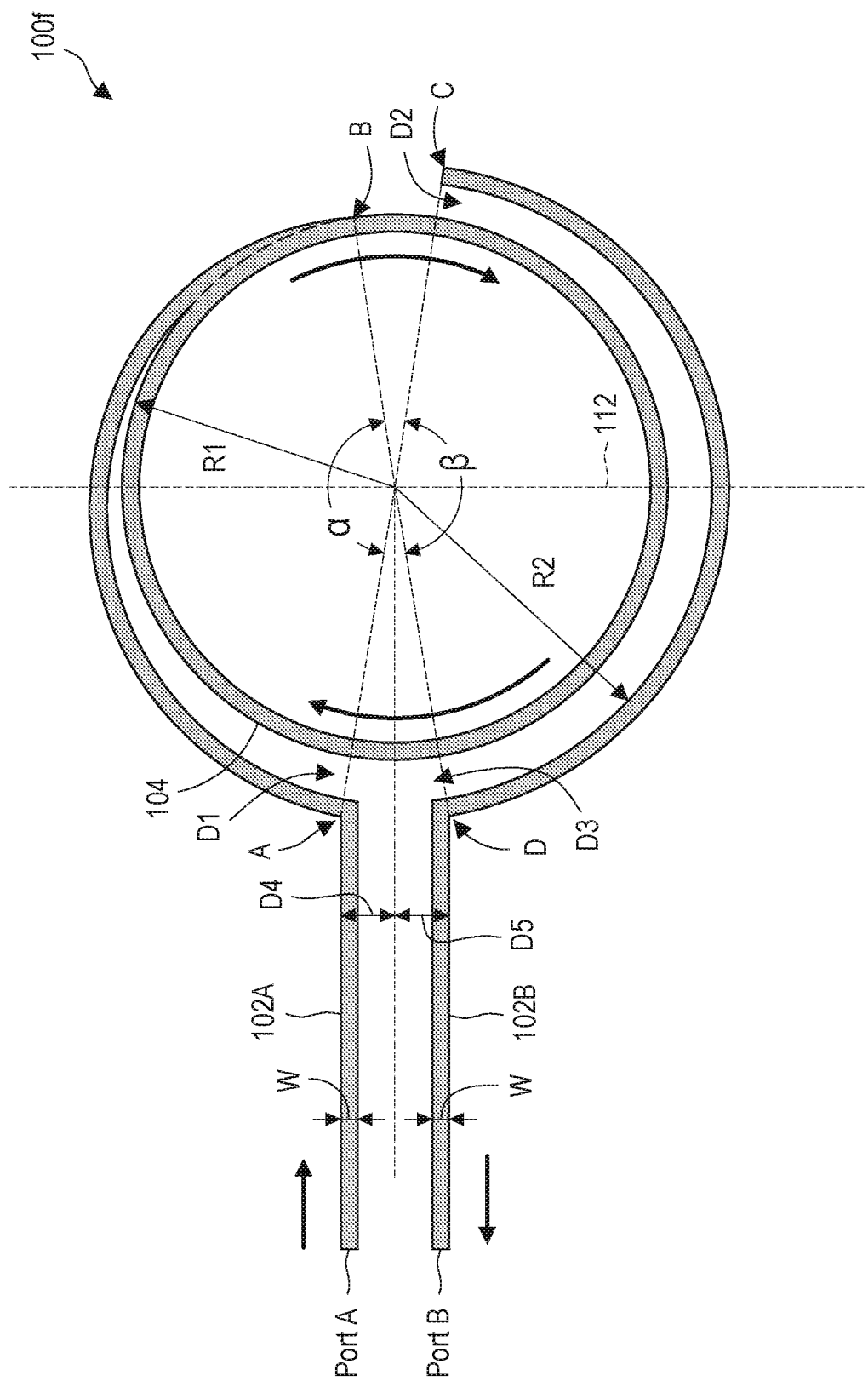

Referring to FIG. 9, a photonic circuit 100f includes a first optical waveguide 102A, a second optical waveguide 102B, and a ring resonator 104. The first and second optical waveguides 102A and 102B and the ring resonator 104 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

The first optical waveguide 102A has a first portion (input portion or rail portion) in a form of a straight rail that has an input port Port A and a second portion (injection portion or tapering portion) that starts tapering towards the circumference of the ring resonator 104 at a point A and intersects the circumference of the ring resonator 104 at a point B. A distance between the circumference of the ring resonator 104 and the tapering portion decreases from a distance D1 at point A to zero at point B. Different from the embodiment illustrated in FIG. 8, in which the central angle $\alpha$ is less than about 90°, in the embodiment illustrated in FIG. 9 the tapering portion (from point A to point B) surrounds the ring resonator 104 for nearly half a circle with the central angel $\alpha$ close to about 180°. In some embodiments, the central angel $\alpha$ is at least larger than about 90°, such as from about 100° to about 180°. The extended tapering portion may recollect escaping photons and re-inject the photons to the ring resonator 104, which increases near-field coupling energy efficiency and compensate bending loss in a ring resonator. The straight rail has a distance D4 to a virtual line 112 traveling through a center of the ring resonator 104 and parallel to the straight rail. D4 is less than the radius of the ring resonator 104.

The second optical waveguide 102B has a first portion (coupling portion or arc portion) in a form of an arc that partially circles the ring resonator 104 and a second portion (output portion or rail portion) in the form of a straight rail that has an output port Port B. An extension of the straight rail of the second optical waveguide 102B intersects the circumference of the ring resonator 104. The straight rail of the second optical waveguide 102B is parallel to the straight rail of the first optical waveguide 102A and has a distance D5 to the virtual line 112 traveling through a center of the ring resonator 104. D5 is less than the radius of the ring resonator 104. Regarding the arc potion, by partially circling the ring resonator 104, the coupling path is extended, and efficiency of collecting photons escaping from the ring resonator 104 is increased, which mitigates intrinsic losses occurred in a ring resonator, particularly bending loss and scattering loss. The distances between the circumference of the ring resonator 104 and the starting point C and ending point D of the coupling portion are denoted as D2 and D3, respectively. The arc shape of the coupling portion may partially circle the ring resonator 104 conformally (i.e., the arc and the ring are concentric) with a constant distance (i.e., D2=D3). Alternatively, the arc shape of the coupling portion may gradually taper away from the second ring resonator 306 (i.e., D2<D3).

The ring resonator 104 has a radius R1, the arc portion of the second ring resonator 102B has a radius R2, and the straight rail portions of the optical waveguides 102A and 102B each have a width W. In some embodiments, R1 and R2 each range from about 5 um to about 12 um with R1 less than R2 (R1<R2). In some embodiments, W ranges from about 1 um to about 2 um. In some embodiments, D1, D2, D3, D4, and D5 each range from about 100 nm to about 1 um. In some embodiments, D4 equals D5 (D4=D5). In some embodiments, D4 is larger than D5 (D4>D5) or less than D5 (D4<D5). In some embodiments, D1 is larger than D2 and D3 (D1>D2 and D1>D3). The above numeral values are exemplary, and the dimensions and intervals of the ring resonator 104 and the optical waveguides 102A and 102B can be variously formed in consideration of the wavelength of the incident light and the desired squeeze level. In some embodiments, to create co-resonance between the ring resonator 104 and the arc portion of the second ring resonator 102B to increase quality factor and squeeze level of the ring resonator, R1 and R2 may meet the condition represented by Equation 1-1 listed above.

In some embodiments, the central angel $\alpha$ is at least larger than about 90°, such as from about 100° to about 180°. The range is not trivial. A central angel $\alpha$ larger than about 90° ensures reinjection rate of sending the escaping photons back to a ring resonator. Otherwise, the collection and reinjection capability provided by the first optical waveguide 102A is omittable. In the illustrated embodiment, the central angle $\beta$ is at least larger than about 90°, such as from about 100° to about 180°. In furtherance of embodiments, the central angle $\beta$ may equal the central angle $\alpha$ ($\alpha=\beta$). For example, the tapering portion of the first optical waveguide 102A and the arc portion of the second optical waveguide 102B each surround the ring resonator 104 for about half a circle. In some embodiments, the central angle $\beta$ is larger than the central angle $\alpha$ ($\beta>\alpha$). In some embodiments, the central angle $\beta$ is smaller than the central angle $\alpha$ ($\beta<\alpha$).

Photon source(s) provides photons to the first optical waveguide 102A at Port A. The source (incident) photons propagate in the direction towards the injection portion that merges with the circumference of the ring resonator 104. Due to the direct injection, almost all the source photons enter the ring resonator 104 with a nearly 100% in-coupling efficiency. The extended tapering portion may recollect escaping photons and re-inject the photons to the ring resonator 104, which increases near-field coupling energy efficiency and compensate bending loss in a ring resonator. An SFWM process may occur in the ring resonator 104, and thus a fraction of photons undergoes the SFWM process and squeezed photons are generated. The photons (if not dissipated) eventually are coupled to the second optical waveguide 102B through its arc-shape coupling portion and propagate towards the Port B. The arc portion provides a longer path for recollecting squeezed photons and increases photon recollection rate, which effectively mitigate intrinsic losses. Since the tapering portion for input and coupling portion for output each surround about half a circle of the ring resonator 104, such coupling is also referred to as semi-circumferential-taper-inject in and semi-circumferential-near-field-coupled out.

The exemplary optical resonator structures in FIGS. 4-9 provide a squeezed photon source with a nearly 100% in-coupling efficiency and a nearly 100% out-coupling efficiency, and accordingly a nearly 100% optical power efficiency. Such optical resonator structures also provide high quality factors and can be implemented in optical communication systems as well.

Although not intended to be limiting, one or more embodiments of the present disclosure provide many benefits to photonic quantum technologies and/or optical communication systems. In photonic quantum technologies field, the exemplary optical resonator structures provide squeezed light source with high optical power efficiency. In optical communication system field, the exemplary optical resonator structures provide wavelength filtering with high quality factors.

In an example aspect, the present disclosure is directed to an optical device. The optical device includes a ring resonator, a first optical waveguide with an end portion merged into a circumference of the ring resonator, the first optical waveguide being configured to receive photons, and a second optical waveguide free of contact with the circumference of the ring resonator, the second optical waveguide being configured to output photons coupled from the ring resonator. In some embodiments, the ring resonator includes an optical medium providing a third-order nonlinear optical susceptibility. In some embodiments, the first optical waveguide includes a straight rail tangential to the circumference of the ring resonator. In some embodiments, the end portion of the first optical waveguide is a tapering line. In some embodiments, a central angle of the ring resonator subtended by the tapering line is less than about 30°. In some embodiments, the tapering line surrounds the ring resonator for about half a circle. In some embodiments, the second optical waveguide includes an arc partially surrounding the ring resonator. In some embodiments, a central angle of the ring resonator subtended by the arc is larger than about 90°. In some embodiments, the arc surrounds the ring resonator for about half a circle. In some embodiments, the ring resonator and the arc are concentric.

In another example aspect, the present disclosure is directed to an optical device. The optical device includes a ring resonator, a first optical waveguide directly injecting photons into the ring resonator, and a second optical waveguide accepting photons escaping from the ring resonator through near-field coupling. The ring resonator and the first and second optical waveguides are disposed above a semiconductor substrate. In some embodiments, the second optical waveguide includes an arc portion that partially surrounds the ring resonator conformally. In some embodiments, a central angle of the ring resonator subtended by the arc portion is larger than about 90°. In some embodiments, the first optical waveguide includes a tapering portion that merges into a circumference of the ring resonator. In some embodiments, the first optical waveguide includes a first straight rail, the second optical waveguide includes a second straight rail, and the ring resonator is positioned between the first and second straight rails. In some embodiments, the first optical waveguide includes a curve portion configured to collection photons escaping from the ring resonator and reinject the photons back into the ring resonator. In some embodiments, the curve portion surrounds the ring resonator for about half a circle.

In yet another example aspect, the present disclosure is directed to a method. The method includes sending a source light beam into a first optical waveguide, direct injecting the source light beam into a ring resonator through an end portion of the first optical waveguide that is in physical contact with the ring resonator, a fraction of the source light beam being converted into a signal light beam via a spontaneous four-wave mixing process, and coupling the signal light beam into a second optical waveguide through near-field coupling between the ring resonator and the second optical waveguide. In some embodiments, a portion of the second optical waveguide partially surrounds the ring resonator. In some embodiments, the first optical waveguide is a straight line tangential to a circumference of the ring resonator.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
   a ring resonator;
   a first optical waveguide with an end portion merged into a circumference of the ring resonator, wherein the first optical waveguide is configured to receive photons; and
   a second optical waveguide free of contact with the circumference of the ring resonator, wherein the second optical waveguide is configured to output photons coupled from the ring resonator, wherein the first optical waveguide includes a first straight rail, the second optical waveguide includes a second straight rail, a virtual line passing through an end point of the first straight rail and a center of the ring resonator is perpendicular to the second straight rail.

2. The optical device of claim 1, wherein the ring resonator includes an optical medium providing a third-order nonlinear optical susceptibility.

3. The optical device of claim 1, wherein the first straight rail is tangential to the circumference of the ring resonator.

4. The optical device of claim 1, wherein the end portion of the first optical waveguide is a tapering line.

5. The optical device of claim 4, wherein a central angle of the ring resonator subtended by the tapering line is less than about 30°.

6. The optical device of claim 4, wherein the tapering line surrounds the ring resonator for about half a circle.

7. The optical device of claim 1, wherein the second optical waveguide includes an arc partially surrounding the ring resonator.

8. The optical device of claim 7, wherein a central angle of the ring resonator subtended by the arc is larger than about 90°.

9. The optical device of claim 7, wherein the arc surrounds the ring resonator for about half a circle.

10. The optical device of claim 7, wherein the ring resonator and the arc are concentric.

11. An optical device, comprising:
    a ring resonator;
    a first optical waveguide directly injecting photons into the ring resonator; and
    a second optical waveguide accepting photons escaping from the ring resonator through near-field coupling, wherein the ring resonator and the first and second optical waveguides are all disposed above a top surface of a semiconductor substrate,
    wherein the second optical waveguide includes an arc portion that partially surrounds the ring resonator, and wherein the second optical waveguide terminates at an end of the arc portion.

12. The optical device of claim 11, wherein the arc portion partially surrounds the ring resonator conformally.

13. The optical device of claim 12, wherein a central angle of the ring resonator subtended by the arc portion is larger than about 90°.

14. The optical device of claim 11, wherein the first optical waveguide includes a tapering portion that merges into a circumference of the ring resonator.

15. The optical device of claim 11, wherein the first optical waveguide includes a first straight rail, the second optical waveguide includes a second straight rail, and the ring resonator is positioned between the first and second straight rails.

16. The optical device of claim 11, wherein the first optical waveguide includes a curve portion configured to collection photons escaping from the ring resonator and reinject the photons back into the ring resonator.

17. The optical device of claim 16, wherein the curve portion surrounds the ring resonator for about half a circle.

18. A method, comprising:
sending a source light beam into a first optical waveguide;
direct injecting the source light beam into a ring resonator through an end portion of the first optical waveguide that is in physical contact with the ring resonator, wherein a fraction of the source light beam is converted into a signal light beam via a spontaneous four-wave mixing process; and
coupling the signal light beam into a second optical waveguide through near-field coupling between the ring resonator and the second optical waveguide, wherein the first optical waveguide, the ring resonator, and the second optical waveguide are all level and embedded in a dielectric layer disposed above a top surface of a semiconductor substrate,
wherein the first optical waveguide includes a first straight rail, the second optical waveguide includes a second straight rail, a virtual line passing through an end portion of the first straight rail and a center of the ring resonator is perpendicular to the second straight rail.

19. The method of claim 18, wherein a portion of the second optical waveguide partially surrounds the ring resonator.

20. The method of claim 18, wherein the first straight rail is tangential to a circumference of the ring resonator.

* * * * *